United States Patent
Egawa et al.

(10) Patent No.: US 6,624,973 B2
(45) Date of Patent: Sep. 23, 2003

(54) MAGNETIC HEAD FOR FLOPPY DISK DRIVE AND HARD DISK DRIVE

(75) Inventors: Motoji Egawa, Iwata-gun (JP); Shigeyuki Oishi, Iwata-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 254 days.

(21) Appl. No.: 09/825,845

(22) Filed: Apr. 5, 2001

(65) Prior Publication Data

US 2001/0028532 A1 Oct. 11, 2001

(30) Foreign Application Priority Data

Apr. 7, 2000 (JP) ........................ 2000-105863

(51) Int. Cl.[7] .............................................. G11B 5/11
(52) U.S. Cl. ..................................................... 360/129
(58) Field of Search ................................. 360/129, 128, 360/125

(56) References Cited

U.S. PATENT DOCUMENTS

| | | | |
|---|---|---|---|
| 5,151,837 A | 9/1992 | Wakasugi et al. | 360/128 |
| 5,459,629 A | 10/1995 | Wakasugi | 360/104 |
| 5,629,821 A * | 5/1997 | Wakasugi et al. | 360/125 |
| 5,889,642 A | 3/1999 | Egawa et al. | 360/125 |

FOREIGN PATENT DOCUMENTS

| JP | 03245309 | * 10/1991 |
|---|---|---|
| JP | 05135323 | * 6/1993 |

* cited by examiner

*Primary Examiner*—David Davis
(74) *Attorney, Agent, or Firm*—Oliff & Berridge, PLC

(57) ABSTRACT

A magnetic head that is excellently adapted to a magnetic core reduced in thickness. When a magnetic core which is reduced in thickness for adaptation to a high recording density is inserted in an opening of a size conventionally formed in a magnetic head of a standard recording density type, a spacer made of a material equivalent or identical to that of a slider is inserted between the magnetic core and the inner wall of the opening. The magnetic core is positioned by means of projections formed on the inner wall of the opening and the spacer. Then, glass as a sealing material is poured into gaps formed in the opening by the magnetic core, the inner wall of the opening and the spacer. The inserted spacer reduces a space volume for the glass to be poured. Further, since the spacer is made of the material equivalent or identical to that of the slider, a partial abrasion at a sliding surface of the slider sliding on a recording medium can be eliminated.

15 Claims, 7 Drawing Sheets

MAGNETIC HEAD FOR FLOPPY DISK DRIVE AND HARD DISK DRIVE

BACKGROUND OF THE INVENTION

1. Field of the Invention

The present invention relates to a magnetic head for use in a floppy disc drive (FDD) and a hard disc drive (HDD).

2. Description of the Related Art

An example of a conventional magnetic head that is used in an FDD is shown in FIG. 10.

In FIG. 10, a magnetic head 1' is, in general, composed of a slider 2 sliding on a magnetic recording medium (not shown), a substantially rectangular opening 3 formed in the slider 2, a magnetic core 6 having gaps (a read/write gap 4 and an erasing gap 5), inserted into the opening 3 and sealed up with a sealing material such as glass, a back yoke 7 made of a magnetic material and joined to the magnetic core 6 to thereby form a closed magnetic path, and a read/write coil 11 and an erasing coil 12 respectively provided on leg portions 8, 10 of the back yoke 7.

The magnetic core 6, which is inserted in the opening 3 formed in the slider 2, is sealed up with glass, etc. which is molten and poured into gaps formed between the magnetic core 6 and inner walls of the slider 2 in order to prevent it from happening that foreign substances like dusts get in the gaps and deteriorate characteristics.

The slider 2 including the opening 3 is formed by press-molding and then sintering. However, the opening 3 formed with this method does not always have a precise rectangular shape. As shown in FIG. 11, the opening 3 may be deformed in such a manner as to have an increased width at the middle or its longitudinal direction (FIG. 11) or a decreased width to the contrary. The magnetic core 6 inserted in the opening 3 with such a deformation is apt to move freely when molten glass is poured thereinto, making it difficult to determine an appropriate position of the magnetic core 6.

FIG. 12 shows an embodiment in which projections 30*a*, 31*a* and 31*b* are provided on some of the inner walls of the opening 3 as a means for locating the magnetic core 6 at an appropriate position.

Of four inner walls 30, 31, 32 and 33, which define the opening 3, the inner wall 30 is provided at its middle with the projection 30*a* extending in a depth direction (in a direction perpendicular to the paper of FIG. 12) of the opening 3. The inner wall 31 is provided with the two projections 31*a*, 31*b* having the same height as the projection 30*a* and extending in a depth direction of the opening 3 like the projection 30*a*.

In a magnetic head shown in FIG. 12, when molten glass is poured into the opening 3, gaps between the magnetic core 6 and the inner walls 30, 31 provided with the projections 30*a*, 31*a*, 31*b* are to receive more molten glass than those between the magnetic core 6 and the inner walls 32, 33 provided with no projection. Accordingly, there is generated an imbalance of surface tension in the poured glass, and the magnetic core 6 is moved toward the inner walls 32, 33 to be duly positioned. However, the amount of glass poured between the magnetic core 6 and the inner walls 30, 31 provided with the projections 30*a*, 31*a*, 31*b* is different from the amount of glass poured between the magnetic core 6 and the inner walls 32, 33 provided with no projection. Therefore, if the viscosity of the glass is smaller than the optimum, the glass is too fluid and may flow out in an undesirable way when poured between the magnetic core 6 and the inner walls 30, 31. On the other hand, if the viscosity of the glass is larger than the optimum, the glass may not satisfactorily flow between the magnetic core 6 and the inner walls 32, 33.

In order to solve such problems, a magnetic head shown in FIG. 13 is provided with projections 32*a*, 33*a*, 33*b* on the inner walls 32, 33, which are located to oppose respectively the projections 30*a*, 31*a*, 31*b* on the inner walls 30, 31. According to this magnetic head, the glass can be easily poured between all the inner walls 30 to 33 and a magnetic core 6. However, it is still impossible to determine an appropriate position of the magnetic core 6 because there are gaps existing between the respective projections and the magnetic core 6, in other words, the width and length of the magnetic core 6 are different from the distances between the projections 31*a* and 33*a*, and 31*b* and 33*b* and between the projections 30*a* and 32*a*, respectively.

Now, in a magnetic head shown in FIG. 14, of projections provided on the four inner walls 30 to 33, projections 30*a'*, 33*a'* and 33*b'* on the inner walls 30 and 33 are formed such that their heights from the inner walls are smaller than those of the projections 31*a*, 31*b* and 32*a* on the inner walls 31 and 32. With this formation, when glass is poured into an opening 3, the glass is to flow in a larger amount into gaps between the magnetic core 6 and the inner wall 31 provided with higher projections and between the magnetic core 6 and the inner wall 32 provided with a higher projection, than into gaps between the magnetic core 6 and the inner wall 30 provided with a lower projection and between the magnetic core 6 and the inner wall 33 provided with lower projections. Therefore, a difference is generated in surface tension of the glass, and the magnetic core 6 is moved toward the inner walls 30 and 33. As a result, the magnetic core 6 at one side is aligned to the heights of the projections 30*a'*, 33*a'* and 33*b'* to be duly positioned. Since the projections 30*a'*, 33*a'* and 33*b'* exist on the inner wall 30 and 33, toward which the magnetic core 6 is moved, gaps are secured between the inner walls 30 and 33 and the magnetic core 6, thereby allowing the glass to appropriately flow.

In a composite type magnetic head for an HDD, a metal spacer maybe used as a means of positioning a magnetic core. For instance, a thin plate spring made of phosphorous bronze, beryllium copper or the like is put as a spacer between the magnetic core and the inner walls or the opening to determine an appropriate position of the magnetic core. However, the thermal expansion coefficient of metal as a spacer is greatly different from that of the glass to be poured in the opening to seal up the magnetic core, so cracks are easily generated in the glass. Further, if the metal used as a spacer is exposed at a surface sliding on a recording medium, since the hardness of the metal is lower than that of the glass and of ceramics as a magnetic core material, the metal part is worn away more quickly due to friction, which causes a partial abrasion in the slider. As a result, there is a deterioration easily generated with regard to a contact with a recording medium and a posture thereto.

As a density of a recording medium becomes higher, it is required to increase a track density in order to increase a writing capacity of a unit track, forcing its track width to be decreased. While this reduces the thickness of a magnetic core contributing to cost reduction, the wall thickness of a molding die for a slider into which the magnetic core is inserted has to be also reduced creating problems with the strength and life of the molding die. Specifically in a magnetic head for a high recording density FDD of 120 MB type, its track width is about 8 μm, so the thickness of the magnetic core is about 0.08 to 0.1 mm. This means the magnetic head is about ½ as thick as a magnetic head for a standard recording density FOD of 2 MB type. Further, if the thickness of the magnetic core is reduced, it becomes accordingly possible to reduce (narrower) the size of the opening of the slider formed to accept the magnetic core. However, for making the opening of the slider narrower, it is necessary to reduce the thickness of a molding die for forming the opening, whereby the molding die can be easily deformed. This makes it difficult to keep the same precision in the shape of the opening that has been available. The resultant deformation of the opening increases a variation in the accuracy of positioning the magnetic core in the opening. If the projections formed on the inner walls of the opening are set higher while the opening is kept of same size as the opening conventionally sized, a space to be filled with glass, that is, a gap between the inner wall of the opening and the magnetic core is increased, and an increased amount of glass is poured in the opening to seal up the magnetic core. Accordingly, there is more chance for bubbles to be generated in the glass, and also an increased number of stepped portions are generated on the glass due to abrasion by other substances during manufacturing process and the stepped portions may hold fine particles formed by the sliding of the slider on the recording medium, thereby generating a clearance larger than necessary between the magnetic core and the recording medium, which causes a decrease in the output of the magnetic head and damages to the recording medium. And, if the groove of a track is made deeper to meet a higher density of the recording medium while the opening is kept of same size as the opening conventionally sized and the thickness of the magnetic core is kept identical with that of the conventional one, glass is poured in the deeper groove in the process of manufacturing the magnetic core increasing the area filled with glass. So, there are generated same problems as found in the case where the projections on the inner wall of the opening are set higher.

SUMMARY OF THE INVENTION

The present invention has been made in view of the above problems, and an object of the present invention is to provide a magnetic head which enables a smooth flow of glass poured into an opening for sealing up the magnetic core, whereby a magnetic core can be easily and accurately positioned.

In order to solve the above problems, according to a first aspect of the present invention, in a magnetic head comprising a slider opposing a magnetic recording medium, a substantially rectangular opening formed in the slider and a magnetic core inserted in the opening and sealed up therein with a sealing material, the magnetic core is positioned by a spacer made of a material equivalent to that of the slider in thermal expansion coefficient, and the spacer is exposed at a sliding surface of the slider sliding on the magnetic recording medium.

According to a second aspect of the present invention, in the magnetic head according to the first aspect, the spacer is made of the same material that the slider is made of.

According to a third aspect of the present invention, in the magnetic head according to the first or second aspect, a plurality of projections are provided on an inner wall of one longitudinal side of the opening, and the magnetic core is disposed between the spacer and the projections in such a manner as to contact with the projections.

According to a fourth aspect of the present invention, in the magnetic head according to the first or second aspect, each spacer is disposed at both sides of the magnetic core.

According to a fifth aspect of the present invention, in the magnetic head according to the third or fourth aspect, the spacer has a bulge with an increased thickness at one or both ends in the longitudinal direction thereof.

According to a sixth aspect of the present invention, in the magnetic head according to any one of the third to fifth aspects, the spacer has a wedge-shaped section tapering off toward the direction of insertion into the opening.

According to a seventh aspect of the present invention, in the magnetic head according to any one of the first to fourth aspects, the spacer has a step portion with a reduced thickness forming a tenon shape in section at one end in the direction of insertion, and is inserted in the opening in such a manner that the one end with the step portion with a reduced thickness is positioned toward the sliding surface of the slider.

DETAILED DESCRIPTION OF THE PREFERRED EMBODIMENT

Hereinafter, embodiments of a magnetic head according to the present invention are described with reference to the accompanying drawings.

Figure 1:
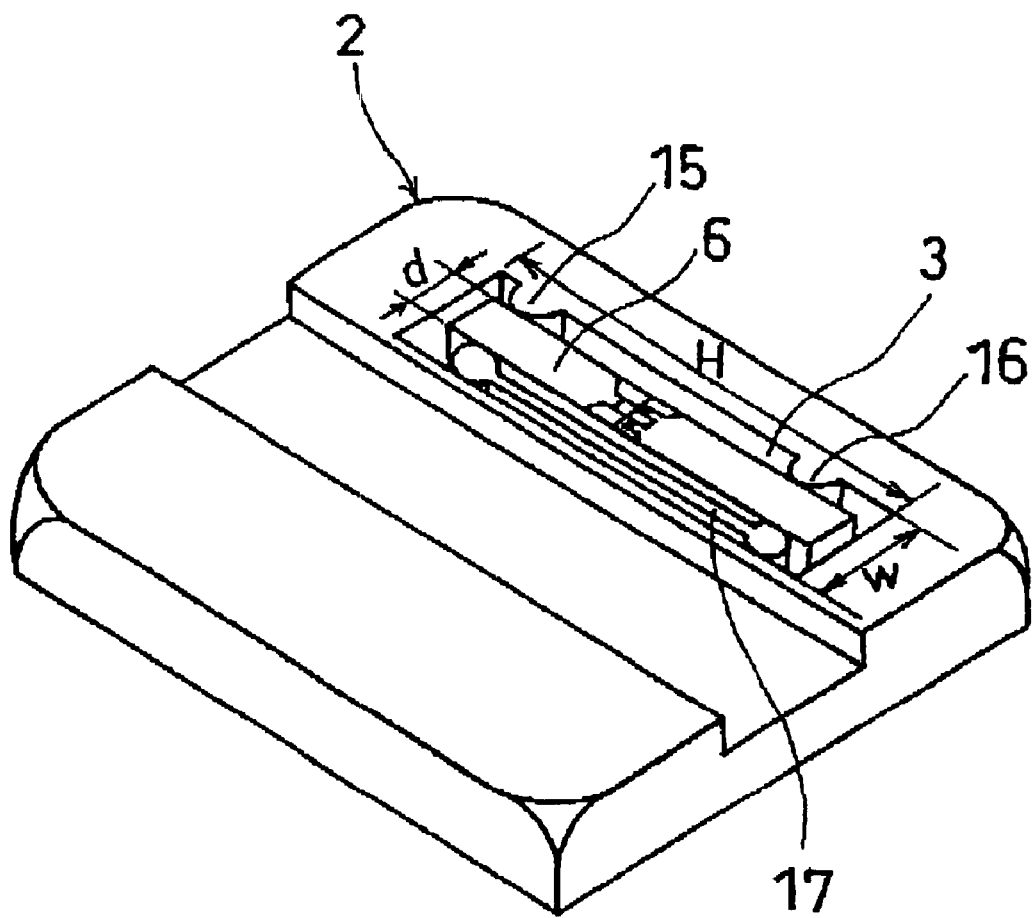
FIG. 1 is a perspective view of a slider of a magnetic head in accordance with an embodiment of the present invention.
Figure 10:
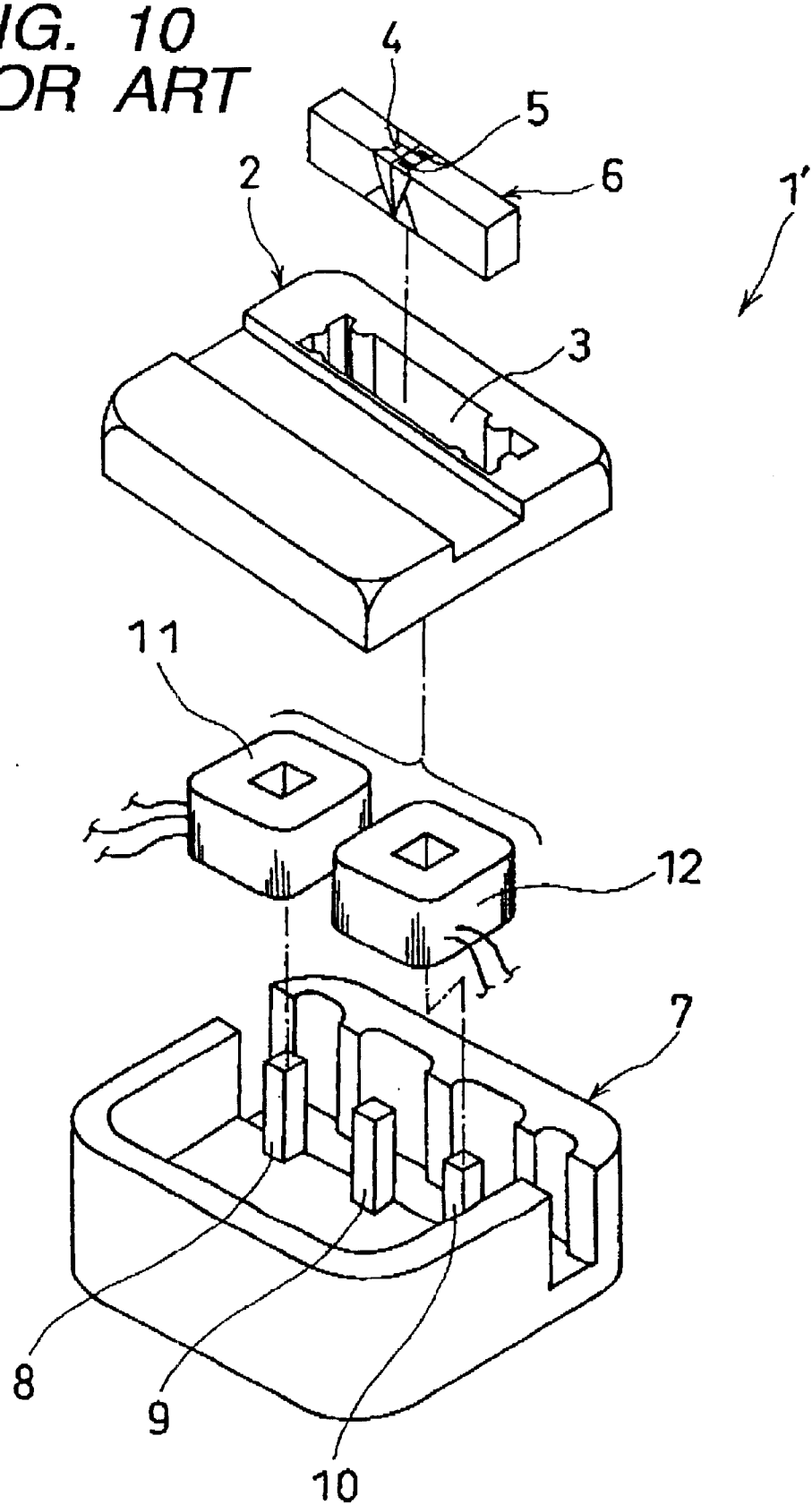
FIG. 10 is an exploded perspective view of a conventional magnetic head.
Figure 11:
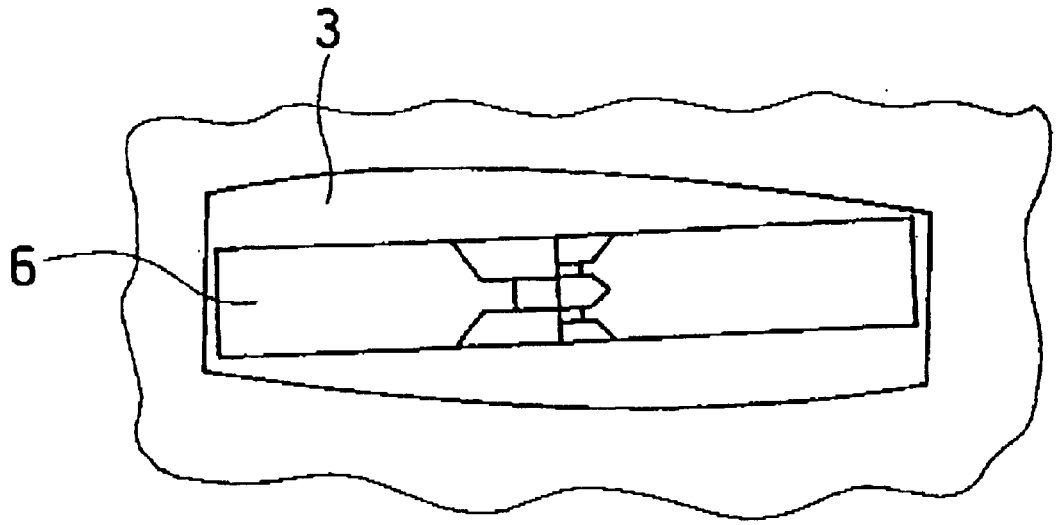
FIG. 11 shows a conventional embodiment in which the magnetic core is inserted into the opening formed in the slider.
Figure 12:
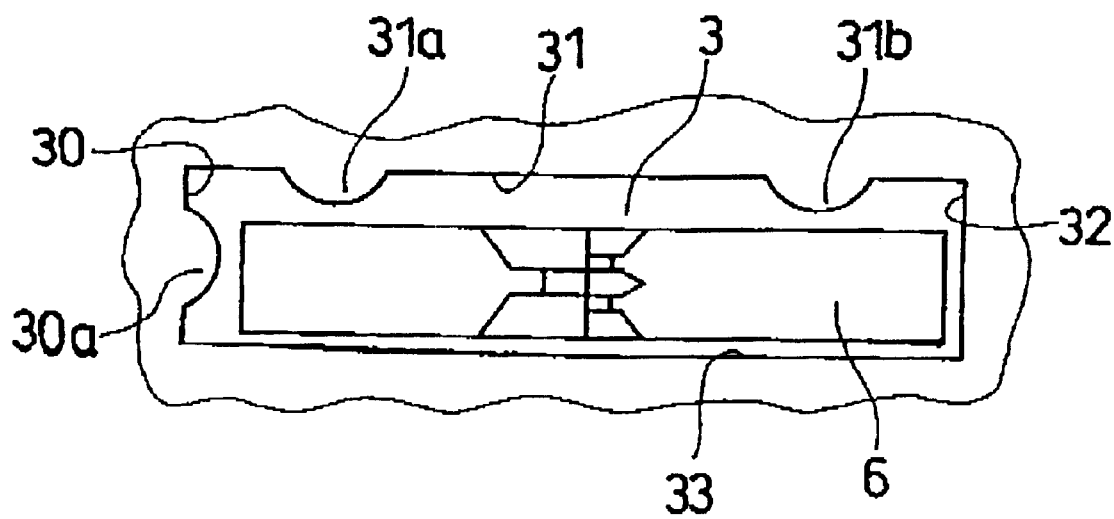
FIG. 12 shows another conventional embodiment in which the magnetic core is inserted into the opening formed in the slider.
Figure 13:
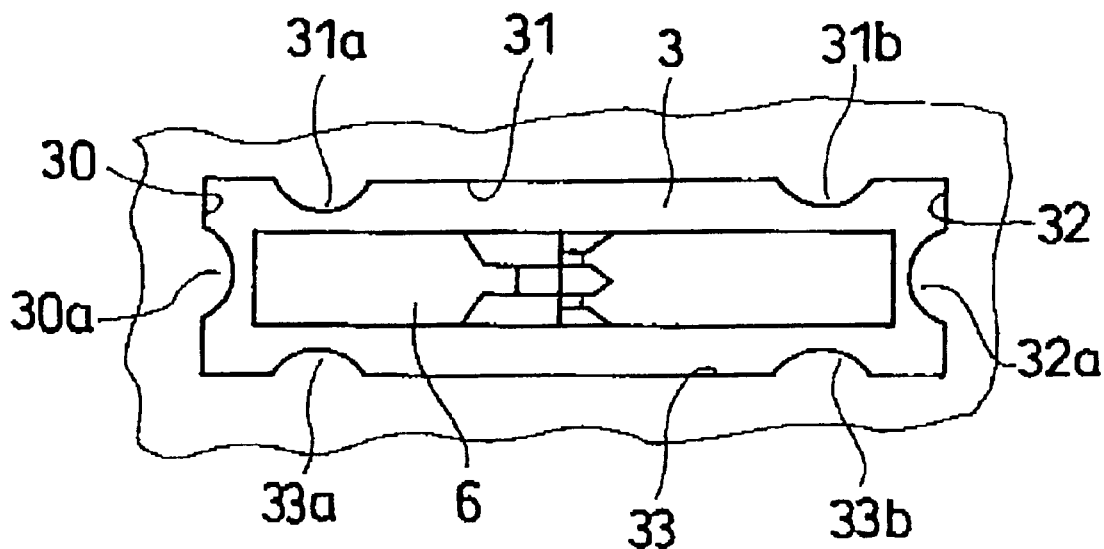
FIG. 13 shows still another conventional embodiment in which the magnetic core is inserted into the opening formed in the slider.
Figure 14:
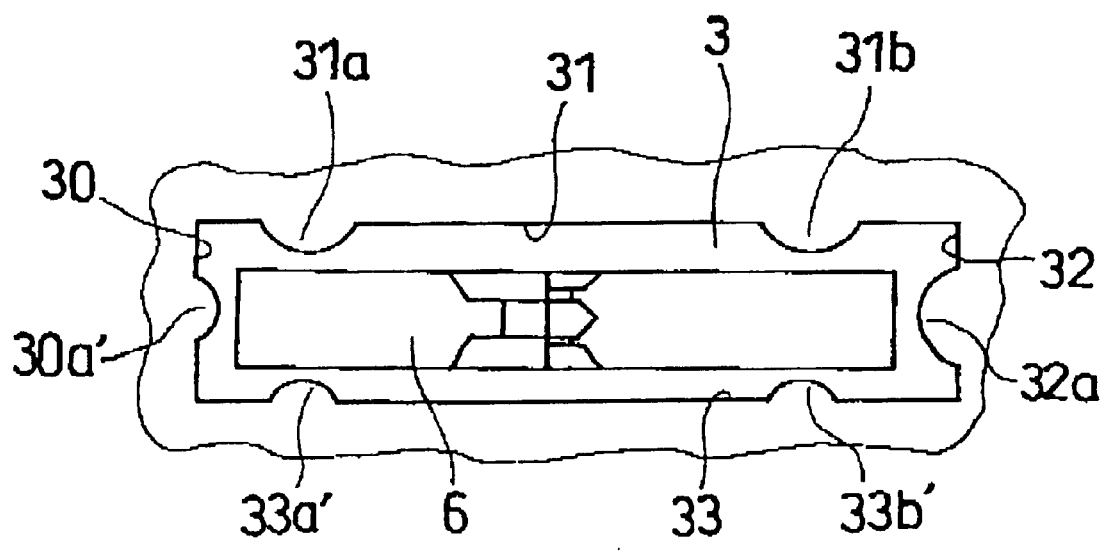
FIG. 14 shows still another conventional embodiment in which the magnetic core is inserted into the opening formed in the slider.

FIG. 1 is a perspective view of a slider 2 of a magnetic head in accordance with an embodiment of the present invention. The magnetic head (not shown) has the same structure as a conventional one shown in FIG. 10. The slider 2 is joined to a back yoke 7 which is provided with leg portions 8,9,10, and a read/write coil 11 and an erasing coil 12 are provided on the inner pillars 8, 10, respectively.

A substantially rectangular opening (hereinafter referred to as "opening") 3 is formed in the slider 2 shown in FIG. 1, and a magnetic core 6 is inserted therein. Projections 15, 16 are provided on an inner wall of one longitudinal (in an H direction) side of the opening 3, and a spacer 17 made of a material to be described later is inserted between an inner wall of the other longitudinal side of the opening 3 and the magnetic core 6. That is, the magnetic core 6 is fixed in the opening 3 in such a manner as to be sandwiched between the projections 15, 16 and the spacer 17. And a sealing material such as glass is poured into the opening 3 to seal up the magnetic core 6.

Figure 2:
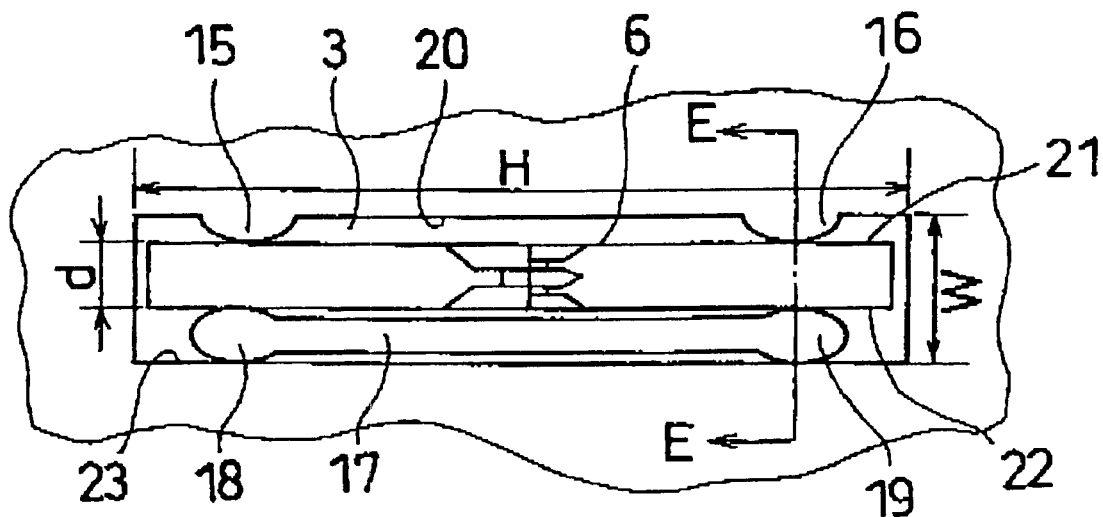
FIG. 2 shows a magnetic core and a spacer inserted into an opening in accordance with the embodiment of the present invention.

FIG. 2 is a view showing the magnetic core and the spacer inserted in the opening 3 in accordance with the embodiment of the present invention seen from the sliding surface.

The magnetic core 6 inserted in the opening 3 is adapted to cover a recording medium of a high recording density type. The magnetic core 6 has its track width decreased to increase a track density and its thickness decreased to reduce cost. As mentioned above, the thickness d of the magnetic core is about 0.08 to 0.1 mm which is approximately ½ as large as the thickness of a magnetic core which covers a recording medium of standard recording density type(2 MB).

On the other hand, the size (width W and length H) of the opening 3 to accept the magnetic core 6 is same as that of the opening conventionally formed in a slider of a magnetic head for a recording medium of a standard recording density type. Since the magnetic core 6 is a made thinner as described above, it is possible to decrease the width W of the opening 3. To do so, however, a molding die has to be thinned at a portion to form the opening 3 and the portion to form the opening 3 can be easily deformed at the time of molding, thereby making it difficult to keep the level of the precision with regard to the shape of the opening as has been available. So, the width W remains unchanged.

The two projections 15, 16 extending in a depth direction of the opening 3 (in a direction perpendicular to the paper of FIG. 2) are provided on an inner wall 20. The two projections 15, 16 are of the same height and are convex in section. The magnetic core 6 inserted into the opening 3 is disposed in such a manner that a side 21 thereof contacts with the projections 15, 16 each having the same height. This means that the position of the magnetic core 6 with regard to a direction vertical to the side 21 is determined by the projections 15, 16.

Figure 4:
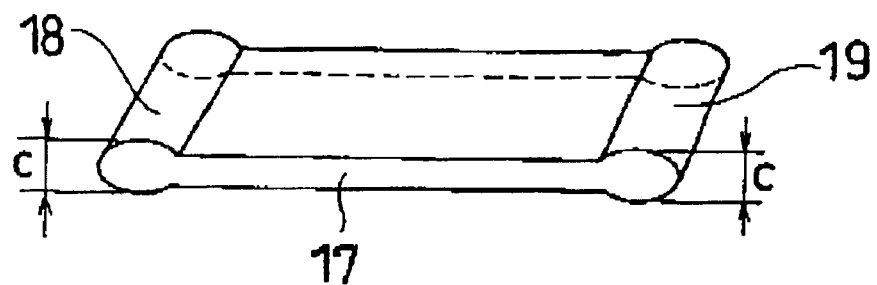
FIG. 4 is a perspective view of the spacer in accordance with the embodiment of the present invention.

A spacer 17 is inserted between the other side 22 of the magnetic core 6 and an inner wall 23 of the longitudinal side of the opening 3. The shape of the spacer 17 is shown in FIG. 4. The spacer 17 is formed to have a shape of a rectangular plate having two bulges 18, 19 with an increased thickness on its both ends in a longitudinal direction thereof, respectively, and is formed in such a manner that the thickness c of the bulges 18, 19 is approximately equal to the distance of a space formed between the other side 22 of the magnetic core 6 and the inner wall 23 of the opening 3 in FIG. 2, namely, in such a manner that the bulges 18, 19 are disposed close to both the side 22 and the face of inner wall 23 when the spacer 17 is inserted. The spacer 17 is precisely formed by molding (pressing) in accordance with the size of a space into which the spacer 17 is inserted.

A gap is formed between the magnetic core 6 and the inner wall 20 by providing the projections 15, 16, and two gaps are formed between the magnetic core 6 and the inner wall 23 by providing the spacer 17 with the bulges 18, 19, whereby molten glass as a sealing material is adapted to satisfactorily flow to both sides of the magnetic core 6, that is, into the whole of the opening 3.

The spacer 17 is desired to be formed of a material equivalent in workability and thermal expansion coefficient to a material of the slider 2, preferably the same material the slider 2 is made of. The reason is that it can be prevented that cracks are generated in the glass due to the difference in thermal expansion coefficient between the spacer 17, the slider 2 in which the opening 3 is formed and the glass which is poured into the gaps in the opening 3. Another reason is that since the spacer 17 is close in workability to the slider 2 and the glass, there are provided similar working properties making it possible to obtain a preferable sliding surface. Still another reason is that even if the spacer 17 is exposed at a sliding surface of the slider sliding on a recording medium, partial abrasion caused at the spacer 17 by sliding is prevented, and thus imperfect contact with the recording medium can be prevented thereby obtaining a preferable output. Concretely, a ceramic material such as calcium titanate is used.

According to the above-mentioned constitution, although the magnetic core 6 is inserted into the opening (width=W) of the same size as an opening formed in a magnetic head for a recording medium of a conventional standard recording density type, the magnetic core 6 reduced in thickness (thickness=d) has its both sides 21, 22 disposed to the projections 15, 16 formed on the opening 3 and the spacer 17, respectively, to thereby maintain its appropriate position. In addition, the volume of the opening 3 is reduced by inserting the spacer, thereby reducing the amount of glass to be poured.

In the above embodiment, the inner wall 20 of the opening 3 is provided with two projections extending in a depth direction of the opening 3. However, the inner wall may be provided with three or more projections which each contact with the side 21 of the magnetic core 6 at a point.

Figure 3:
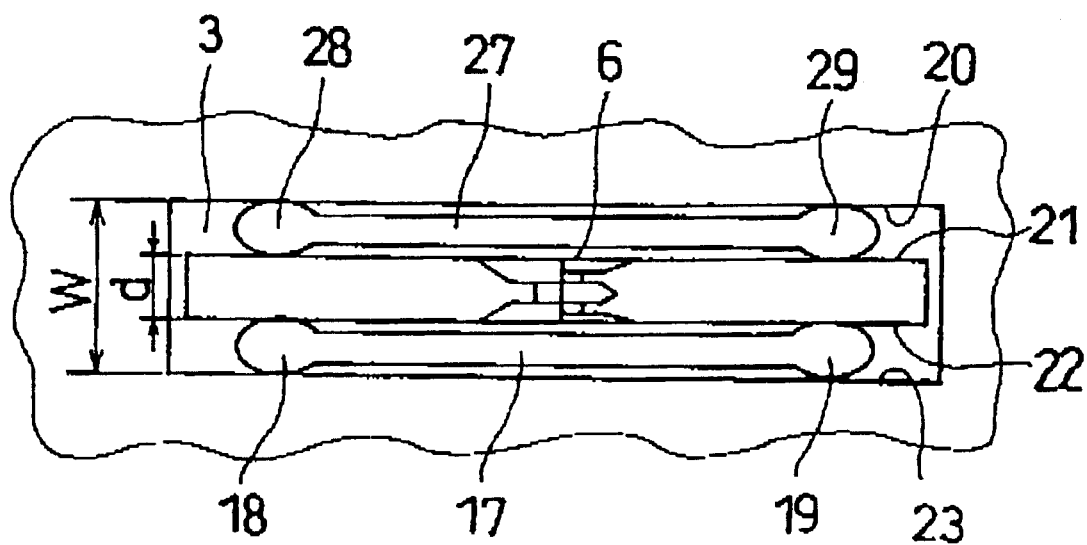
FIG. 3 shows the magnetic core and the spacer inserted into the opening in accordance with another embodiment of the present invention.

FIG. 3 shows a magnetic core and a spacer inserted into an opening in accordance with another embodiment of the present invention.

As shown in the figure, a spacer 27 is inserted between the side 21 of the magnetic core 6 and the inner wall 20 of the opening 3, and the spacer 17 is inserted between the side 22 of the magnetic core 6 and the inner wall 23 of the opening 3. The shape of the spacers 17 and 27 is shown in FIG. 4. Cylindrical bulges 18, 19 are provided on the respective ends of the spacer 17 and cylindrical bulges 28, 29 are provided on the respective ends of the spacer 27. The bulges 18, 19 provided on the spacer 17 and the bulges 28, 29 provided on the spacer 27 are equal in thickness, and their thickness is calculated based on the width W of the opening 3 and the thickness d of the magnetic core 6. From the viewpoint of manufacturing cost, it is desirable the spacers be formed identical with each other. Glass is poured into gaps in the opening 3 as a sealing material. Molten glass is smoothly poured into the opening 3 entirely since the gaps are formed between the inner wall and the spacer and between the spacer and the magnetic core due to the bulges on the spacers 17 and 27. Furthermore, approximately same amount of glass flows to each side of the magnetic core 6 since the spacers 17 and 27 inserted at each side of the magnetic core 6 in the opening are approximately identical with each other in shape. Therefore, the position of the magnetic core 6 in the opening 3 can be determined easily and accurately.

Figure 5:
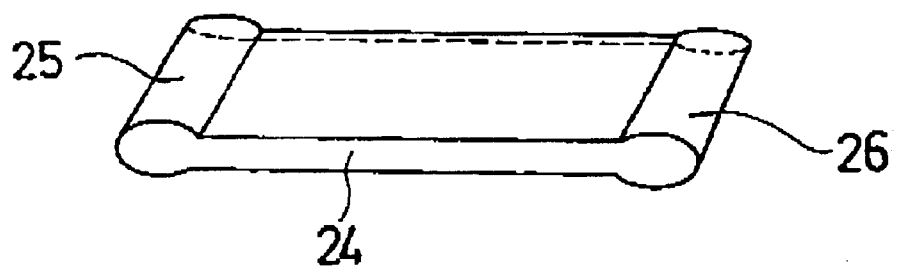
FIG. 5 is a perspective view of the spacer in accordance with another embodiment of the present invention.

FIG. 5 shows a spacer inserted into the opening 3 in accordance with another embodiment of the present invention.

A spacer 24 is gradually decreased in its thickness, i.e., the spacer 24 has a wedge-shaped section tapering off toward the direction of insertion into the opening 3. Further, bulges 25, 26 in a shape of truncated cone are provided on both ends of the spacer 24, respectively.

Figure 6:
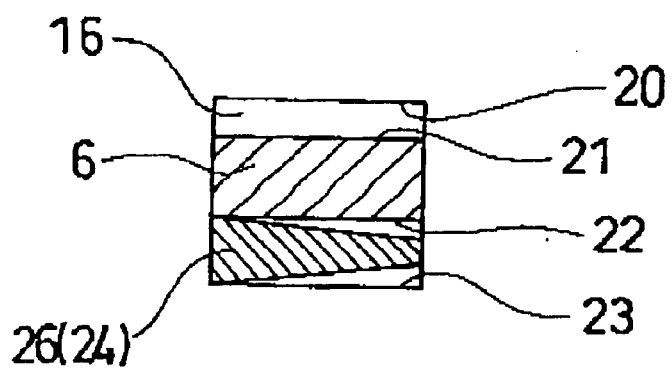
FIG. 6 is a sectional view taken along the line E—E of FIG. 2 when the wedge-like spacer is inserted.

FIG. 6 is a sectional view taken along line E—E of FIG. 2 when the spacer 24 having the wedge-shaped section is inserted in the opening 3.

As shown in the figure, the spacer 24 having the bulge 26 is inserted in the opening 3 in such a manner that a thicker end of the bulge 26 on the spacer 24 is located toward the sliding surface (i.e., its insertion is from left to right in FIG. 6). The bulge 26 contacts with the side 22 and the inner wall 23 at its thickest portion, i.e., at the sliding surface. Thus, the position of the magnetic core 6 is determined by being sandwiched between the projections 15, 16 provided on the inner wall 20 of the opening 3 and the bulges 25, 26 at the sliding surface provided on the spacer 24.

Although one bulge is provided on each of the both ends of the spacer 24 in the above-mentioned embodiment, it is not limited thereto. The spacer 24 may be provided with one bulge on its one end only or three or more bulges.

Figure 7:
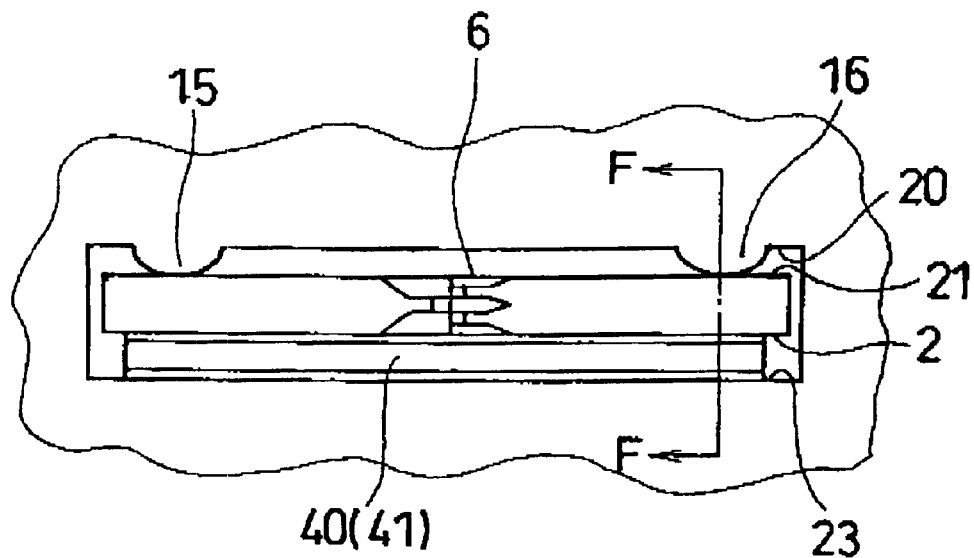
FIG. 7 shows the magnetic core and the spacer inserted into the opening in accordance with still another embodiment of the present invention.

FIG. 7 shows a magnetic core and a spacer inserted in an opening in accordance with still another embodiment of the present invention.

As shown in the figure, the magnetic core 6 is disposed such that its side 21 contacts with the projections 15, 16 provided on the inner wall 20 of the opening 3, and another side 22 contacts with a spacer 40. The position of the magnetic core 6 is determined by the projections 15, 16 and the spacer 40. As in the above-mentioned embodiment, glass as a sealing material is poured into gaps in the opening 3.

Figure 8:
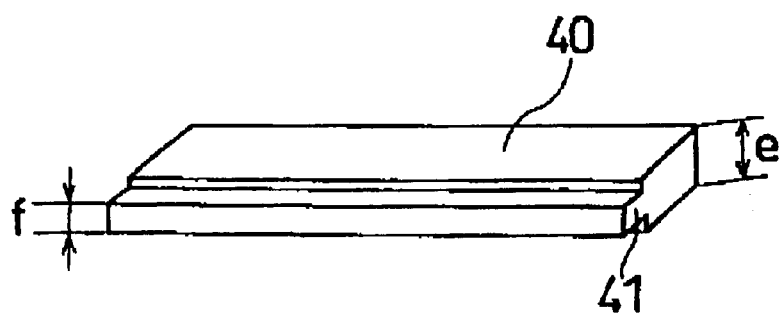
FIG. 8 is a perspective view of the spacer in accordance with the still another embodiment of the present invention.

FIG. 8 shows a shape of the spacer 40. The spacer 40 is in substantially plate-shape and is provided with a step portion 41 with a reduced thickness forming a tenon shape in section at one end in the direction of insertion into the opening 3 (in FIG. 7). The thickness f of the step portion 41 is smaller than the thickness e.

Figure 9:
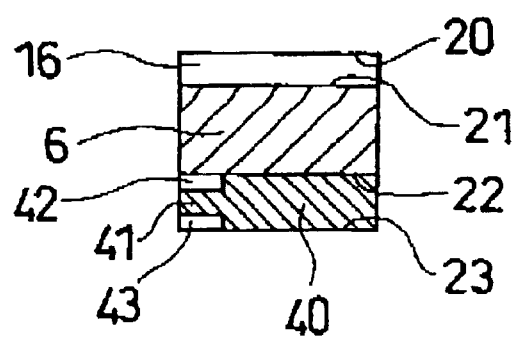
FIG. 9 is a sectional view taken along the line F—F of FIG. 7 when the spacer of FIG. 8 is inserted.

FIG. 9 shows a sectional view taken along line F—F of FIG. 7 when the spacer 40 is inserted in the opening 3. The spacer 40 is inserted in such a manner as to contact with the side 22 of the magnetic core 6 and the inner wall 23 of the opening 3 and such that the step portion 41 with a reduced thickness is disposed toward the sliding surface (at the left side in FIG. 9). When the spacer 40 is inserted, gaps 42, 43 are formed between the step portion 41 and the side 22 of the magnetic core 6 and between the step portion 41 and the inner wall 23 of the opening 3, respectively. A part of glass to be poured into the opening 3 flows in these gaps to seal up the magnetic core 6.

Although the magnetic head including the slider 2 having only one magnetic core 6 of a high recording density is shown in the above-mentioned embodiments, two magnetic cores may be provided in one magnetic head.

According to the magnetic head of the present invention, a magnetic core, even when inserted in an opening conventionally sized for a magnetic head of a standard recording density type, can be appropriately positioned by using a spacer as a means of positioning a magnetic core in an opening in a slider, and thereby a problem of deterioration in precision of the opening resulting from a reduced thickness of a molding die at a portion for forming the opening is eliminated. Furthermore, by forming the spacer with a material close to that of the slider in thermal expansion coefficient, preferably the same material as the slider, glass as a sealing material poured into the opening can be prevented from getting cracked. In addition, gaps are formed between the inner wall of the opening and the spacer by providing bulges on the spacer, and the glass can flow smoothly into the opening and spread therein uniformly. And, by providing the spacer with a wedge-shape in section tapering off toward the direction of insertion the spacer can be inserted into the opening with an improved workability.

What is claimed is:

1. A magnetic head comprising:
   a slider opposing a magnetic recording medium:
   a substantially rectangular opening formed on the slider; and
   a magnetic core inserted in the opening and sealed up therein with a sealing material, wherein the magnetic core is positioned by an insertable spacer made of a material equivalent to that of the slider in thermal expansion coefficient, and the spacer is exposed at a sliding surface of the slider sliding on the magnetic recording medium.

2. A magnetic head according to claim 1, wherein the spacer is made of the same material that the slider is made of.

3. A magnetic head according to claim 2, wherein a plurality of projections are provided on an inner wall of one longitudinal side of the opening, and the magnetic core is disposed between the spacer and the projections in such a manner as to contact with the projections.

4. A magnetic head according to claim 2, wherein each spacer is disposed at both sides of the magnetic core.

5. A magnetic head according to claim 2, wherein the spacer has a step portion with a reduced thickness forming a tenon shape in section at one end in the direction of insertion, and is inserted into the opening in such a manner that the one end with the step portion with a reduced thickness is positioned toward the sliding surface of the slider.

6. A magnetic head according to claim 1, wherein a plurality of projections are provided on an inner wall of one longitudinal side of the opening, and the magnetic core is disposed between the spacer and the projections in such a manner as to contact with the projections.

7. A magnetic head according to claim 6, wherein the spacer has a bulge with an increased thickness at one or both ends in the longitudinal direction thereof.

8. A magnetic head according to claim 7, wherein the spacer has a wedge-shaped section tapering off toward the direction of insertion into the opening.

9. A magnetic head according to claim 6, wherein the spacer has a wedge-shaped section tapering off toward the direction of insertion into the opening.

10. A magnetic head according to claim 6, wherein the spacer has a step portion with a reduced thickness forming a tenon shape in section at one end in the direction of insertion, and is inserted into the opening in such a manner that the one end with the step portion with a reduced thickness is positioned toward the sliding surface of the slider.

11. A magnetic head according to claim 1, wherein each spacer is disposed at both sides of the magnetic core.

12. A magnetic head according to claim 11, wherein the spacer has a bulge with an increased thickness at one or both ends in the longitudinal direction thereof.

13. A magnetic head according to claim 11, wherein the spacer has a wedge-shaped section tapering off toward the direction of insertion into the opening.

14. A magnetic head according to claim 11, wherein the spacer has a step portion with a reduced thickness forming a tenon shape in section at one end in the direction of insertion, and is inserted into the opening in such a manner that the one end with the step portion with a reduced thickness is positioned toward the sliding surface of the slider.

15. A magnetic head according to claim 1, wherein the spacer has a step portion with a reduced thickness forming a tenon shape in section at one end in the direction of insertion, and is inserted into the opening in such a manner that the one end with the step portion with a reduced thickness is positioned toward the sliding surface of the slider.

* * * * *